May 5, 1970  SHIGEHIRO KIMATA  3,509,973
ANTI-SQUEAL DISC BRAKING DEVICE
Filed April 19, 1968

INVENTOR.
S. KIMATA
BY Glascock, Downing & Seebold
ATTORNEYS ited States Patent Office 3,509,973
Patented May 5, 1970

3,509,973
ANTI-SQUEAL DISC BRAKING DEVICE
Shigehiro Kimata, Yokohama, Japan, assignor to Isuzu Motors Ltd., Shinagawa-ku, Tokyo, Japan
Filed Apr. 19, 1968, Ser. No. 722,785
Claims priority, application Japan, Apr. 28, 1967, 42/26,946
Int. Cl. F16d 65/12
U.S. Cl. 188—218          5 Claims

ABSTRACT OF THE DISCLOSURE

A breaking device with a braked member, in which a ring-shaped damping plate is circumferentially installed without metallurgical bonding for the prevention of resonance and squeal thereof.

BRIEF SUMMARY OF THE INVENTION

The present invention relates to a braking device for motor vehicles, especially a braked element which must be understood to refer to a disc in a disc brake or a drum of a drum brake of the device for preventing so-called squeal from being developed when the brake is applied. Squeal is an unpleasant and objectionable vibratory noise caused by the resonance of, for example, a disc in the case of a disc brake due to the self-excited vibrations of the brake-pads when the brake is applied. The problem of preventing squeal has been one of the most important technical problems in the art. Various methods and devices for preventing squeal have been proposed so far, but none of them has ever attained the perfect effect of preventing squeal. An object of this invention is to provide an improved means whereby squeal resulting from brakes may be entirely eliminated.

Another object of this invention to eliminate squeal by preventing the resonance of a braked element (such as a disc or drum) due to the self-excited vibrations of braking means such as pads, shoes or the like, and is characterized in that a damping plate having natural vibrations different from that of the braking means is circumferentially installed in the form of sandwich and securely fixed without metallurgical bonding to the braked member. The above and other objects and features of the present invention will be best understood from the description with reference to the accompanying drawings.

DETAILED DESCRIPTION

Figure 1:
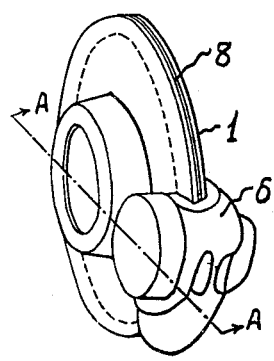
FIG. 1 is a perspective view of the essential part of a disc brake to which is applied a disc according to the present invention.
Figure 2:
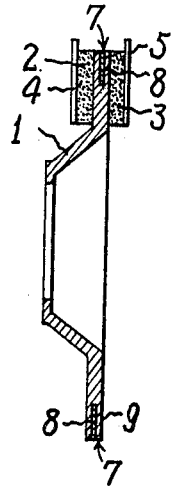
FIG. 2 is a sectional view taken along the line A—A of FIG. 1.

In FIGS. 1 and 2, reference numeral 1 designates a disc of the type used in motor vehicles, which is secured to the wheel or other rotatable member (not shown) by conventional suitable means, and 2 and 3 are brake-pads fixedly secured to backing metal 4 and 5 in a caliper 6 (generally, brake actuating means) so as to interpose the peripheral surfaces of the disc 1 between the pads 2 and 3. A slit is provided in the peripheral end face 7 of the disc 1 and has a uniform depth throughout the whole periphery. (The dotted line shown in FIG. 1 indicates the depth of the slit.)

In the slit is installed (sandwiched) a substantially annular damping plate 8 which is, in this case, divided into two sections or parts which in turn are fixedly secured to the disc 1 by means of rivets 9. Alternately, the damping plate 8 may be press-fitted into the slit. The damping plate 8 has natural vibrations different from that of the disc, and may be of any material having properties such as mechanical properties, heat-resistivity, etc. as required for brake material. For example, the damping plate 8 may be made of a metal or non-metal, for example, a steel, a non-ferrous metal, a carbon steel, an alloy steel, a cast iron, plastic, rubber, etc.

Figure 3:
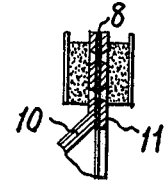
FIGS. 3, 4 and 5 are fragmentary sectional views of other embodiments of the present invention.

As shown in FIG. 3, the disc is divided into two sections 10 and 11 in parallel with each other, and the damping plate 8 may be interposed (sandwiched) between and securely fixed to the sections 10 and 11.

Figures 4, 5:
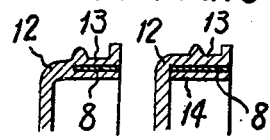

In the case of a drum brake, a pair of shoes in a conventional brake actuating means are expanded against a cylindrical drum to effect the braking action. As shown in FIG. 5 a slit is provided along the substantially whole peripheral length of a cylindrical portion 13 of a drum 12 of the type used in motor vehicles, which is secured to the wheel or other rotatable member (not shown) so as to be in parallel with the axial direction of the drum 12, and a substantially cylindrical damping plate 8 may be fitted into and fixedly secured to, the slit. Alternately the damping plate 8 may be sandwiched between the cylindrical member 14 and the inner surface of the cylindrical portion 13 of the drum 12 as shown in FIG. 5.

The damping plate 8 may be fixed to the braked member (disc or drum) by means of a casting method, but care should be taken that the damping plate 8 not be welded (metallurgically bonded) to the braked member. In this case, of course, there is no need to previously form the slit in the braked member for the installing of the damping plate. The sizes and configurations of the damping plate 8 are not limited to those shown in the accompanying drawings and may be suitably determined as needs demand. Therefore, the sizes and configurations of the slits may be accordingly changed.

In this specification, the "fixing" or "installing" of the damping plate 8 must be understood to be made not only by mechanical methods such as press-fitting, riveting, etc. but also by a casting method with care not to metallurgically bond the damping plate to the braked member as described hereinbefore. Next the operation of the present invention having the construction as described above will be described with reference to FIGS. 1 and 2 in which the present invention is applied to a disc brake. When a brake is applied, the pads 2 and 3 disposed in the caliper 6 are pressed by means of a piston (not shown) against the surfaces of the rotating disc 1 so as to apply the retarding force thereto. In this case, the self-excited vibrations of the pads 2 and 3 are developed by the friction so that the disc 1 itself is also vibrated. However, since the damping plate 8, having natural vibrations different from that of the disc 1, is securely fixed to the disc 1 as described above, the damping plate 8 has a damping action so that the natural vibrations of the disc 1 as a whole is greatly varied, thereby damping the amplitudes of the vibration and preventing resonance from being developed. Thus, it is clearly understood that the resonance of the disc 1 can be completely prevented by means of the damping plate regardless of the pad material, thereby preventing squeal from being developed and that the damping plate can accomplish the above described operations and actions so long as the damping plate has natural vibrations different from those of the disc 1, regardless of a material of the damping plate 8.

As described hereinbefore, according to the present invention, a braked member (a disc 1 or a drum 12) has a damping plate (which means all the types of the damping plates shown by FIGS. 1–5), having natural vibrations different from those of the braked member and being circumferentially installed or included in the braked member in the form of sandwich (which means all the fixing manner illustrated in FIGS. 1–5), so that the natural vibrations of the braked member are greatly varied or deviated, whereby the self-excited vibrations of the braking means (the pads 2 and 3 or shoes) are transmitted to, and damped by, the braked member in a very effective manner, thereby preventing the resonance and thus squeal.

Furthermore, according to the present invention, the selection of materials for pads or shoes and a damping plate 8 can be made in a very simple manner. Thus, the present invention has a feature that the material for pads or shoes may be selected freely and also the selection of the material for the damping plate 8 is relatively easy as long as the natural vibrations of the damping plate are different from those of the disc or shoe. The present invention has another feature that the damping plate according to the present invention can be applied to any conventional brake in a simple manner since the damping plate 8 need only be securely fixed to the peripheral inner portion of the disc 1 or drum 12.

The advantages of the present invention will be more clearly understood from the experimental results to be described hereinafter. The squeal frequency analysis of a conventional disc brake for motor vehicles was made. The analysis showed that the frequencies in the proximity of 3,000 c.p.s. influence squeal to the greatest extent.

Figure 6:
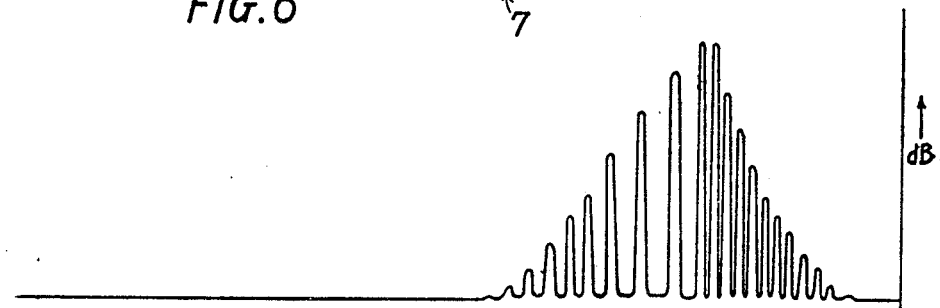
FIG. 6 is a graph showing the frequency analysis of squeal in a field test.
Figure 7:
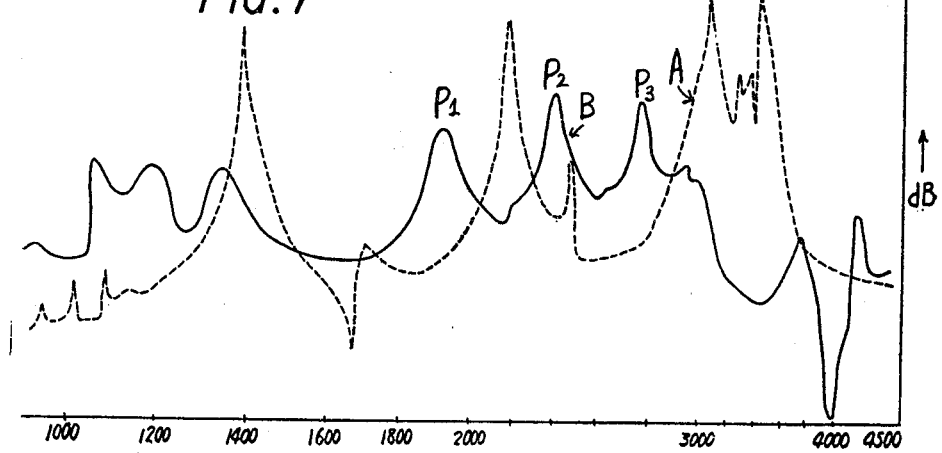
FIG. 7 is a graph for comparing the levels of oscillations or vibrations of the disc of the present invention and of the prior art.

As shown in FIG. 6, the frequencies from 600 to 2,100 c.p.s. and higher than 4,000 c.p.s. were not generated. It was seen that the natural vibrations of the disc was coincident with the frequency of 3,000 c.p.s. The present invention is based upon the idea that squeal can be prevented if a disc which is not susceptible to resonance with the frequency of 3,000 c.p.s. is used. Therefore, a disc in which an annular damping plate (one embodiment of this invention) as shown in FIGS. 1 and 2 is fixedly carried by the inner portion of the disc. The vibration mode of the disc to which is applied the present invention (hereinafter referred to as "new disc") was measured, and it was seen that the vibration mode in the proximity of the frequency of 3,000 c.p.s. was put into disorder. Furthermore, the measurement of the natural vibrations of the new disc showed that the amplitudes were extremely low as compared with those in case of the conventional disc and that the quality factor was deteriorated as shown in FIG. 7. Therefore, the vibration retardation is very great. In FIG. 7, the dotted curve shows the level of the conventional disc and the solid curve, the new disc. The quality factor at the peaks of $p_1$, $p_2$ and $p_3$ are less. Therefore, it can be understood that despite self-excited vibrations of the pads, the resonance in the wide range of frequencies between 600 to 5,000 c.p.s. may be prevented so that no squeal is developed.

I claim:
1. In a disc brake comprising a rotatable member; a disc securely attached to the member for rotation therewith about an axis of rotation; said disc including an outer peripheral portion extending generally perpendicularly to said axis of rotation; brake-pads disposed in brake actuating means and engageable with said disc; and a damping plate solely mechanically interlocked within said outer peripheral portion of said disc, said plate being flat and having a width substantially greater than its thickness, said width of said plate extending in the same direction as said outer peripheral portion of said disc; and said plate having natural vibrations different from those of said disc for preventing resonance and squeal thereof.

2. In a disc brake comprising a rotatable member; a disc affixed to rotate with said rotatable member about an axis of rotation; said disc including an outer peripheral portion extending generally perpendicularly to said axis of rotation; brake actuating means adapted to stop said disc; and a substantially annular damping plate circumferentially installed without resort to metallurgical bonding in the outer peripheral portion of said disc; said plate being flat and having a width substantially greater than its thickness; said width of said plate extending in the same direction as said outer peripheral portion of said disc; and said damping plate having the natural vibrations different from those of said disc for preventing resonance and squeal thereof.

3. A disc brake according to claim 2, wherein said disc is divided into at least two annular plates in parallel with each other and said annular damping plate is sandwiched between said plates.

4. In a disc brake comprising a rotatable member; a disc fixedly attached to said rotatable member for rotation therewith about an axis of rotation; said disc including an outer peripheral portion extending generally perpendicularly to said axis of rotation; brake actuating means adapted to stop said disc, said actuating means having break-pads oppositely disposed on each side of said disc; and a ring-shaped damping plate circumferentially installed and solely mechanically interlocked within said disc, said plate being flat and having a width substantially greater than its thickness; said width of said plate extending in the same direction as said outer peripheral portion of said disc; and said damping plate having natural vibrations different from those of said disc for preventing resonance and squeal of said disc.

5. A disc brake according to claim 4, wherein said disc has a peripheral edge formed with a slit completely around it, said slit has a predetermined depth from said edge and said damping plate being divided into at least two sections and adapted to fit into said slit.

References Cited
UNITED STATES PATENTS
| | | |
|---|---|---|
| 974,549 | 11/1910 | Bryant et al. |
| 2,349,658 | 5/1944 | Horn. |
| 3,286,799 | 11/1966 | Shilton. |

FOREIGN PATENTS
| | | |
|---|---|---|
| 123,707 | 7/1931 | Austria. |

GEORGE E. A. HALVOSA, Primary Examiner